United States Patent
Sugirtharaj

(10) Patent No.: US 6,678,526 B1
(45) Date of Patent: Jan. 13, 2004

(54) METHOD AND SYSTEM FOR PROVIDING A CALL RESERVATION SERVICE THROUGH A PACKET SWITCHED NETWORK

(75) Inventor: David Sugirtharaj, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/408,732

(22) Filed: Sep. 29, 1999

(51) Int. Cl.[7] .......................... H04Q 7/20; H04L 12/28; H04L 12/66
(52) U.S. Cl. .................... 455/450; 455/451; 455/452.1; 455/453; 455/454; 455/509; 455/510; 370/351; 370/353; 370/356
(58) Field of Search ............................. 455/450, 452, 455/453, 454, 509, 510, 512, 514, 426, 452.1, 452.2; 370/351–356, 468

(56) References Cited

U.S. PATENT DOCUMENTS

| | | | | |
|---|---|---|---|---|
| 4,799,253 A | * | 1/1989 | Stern et al. ................... 379/59 |
| 5,054,109 A | * | 10/1991 | Blackburn ................... 455/17 |
| 5,579,382 A | | 11/1996 | Tsukishima ................. 379/209 |
| 5,625,879 A | | 4/1997 | Tuulos ....................... 455/34.1 |
| 5,761,621 A | * | 6/1998 | Sainton ........................ 455/454 |
| 5,790,534 A | * | 8/1998 | Kokko et al. ............... 455/452 |
| 5,794,156 A | * | 8/1998 | Alanara ....................... 455/517 |
| 5,901,145 A | * | 5/1999 | Sawyer ........................ 370/332 |
| 5,978,368 A | * | 11/1999 | Hjelm et al. ................. 370/347 |
| 6,122,263 A | * | 9/2000 | Dahlin et al. ................ 455/450 |
| 6,230,005 B1 | * | 5/2001 | Le et al. ...................... 455/414 |
| 6,292,670 B1 | * | 9/2001 | Kauria et al. ................ 455/518 |

FOREIGN PATENT DOCUMENTS

WO     WO 97/48249     12/1997

OTHER PUBLICATIONS

International Search Report, PCT/SE00/01657, dated Feb. 5, 2001.

* cited by examiner

Primary Examiner—William Trost
Assistant Examiner—Meless Zewdu
(74) Attorney, Agent, or Firm—Jenkens & Gilchrist, P.C.

(57) ABSTRACT

A method and system for reserving a communication channel in a mobile telecommunication network. After a mobile station's initial attempt to place a call fails, because of congestion in a first network, for example, the mobile station requests reservation of a communication channel. Preferably, the reservation request is transmitted via a second network, different from the network used for the initial call attempt. In response to the request, an identification of the mobile station is placed in a queue of the first network for access to a communication channel. Once a communication channel becomes available in the first network, that channel is reserved for use by the mobile station.

31 Claims, 3 Drawing Sheets

METHOD AND SYSTEM FOR PROVIDING A CALL RESERVATION SERVICE THROUGH A PACKET SWITCHED NETWORK

BACKGROUND OF THE INVENTION

1. Technical Field of the Invention

The present invention relates in general to mobile telecommunication services, and in particular to reservation and allocation of voice channels in a congested mobile telecommunications system.

2. Description of Related Art

Initially, mobile telecommunications systems were designed primarily for purposes of enabling voice communications in a wireless environment. As wireless telecommunications systems have evolved, additional voice and messaging services and features have been added. In addition, newer generations of wireless telecommunications systems are being designed to further handle a diverse range of data communications services. Generally, such newer generation systems include both a circuit-switched network that is used for voice communications and a packet-switched network that is used for data communications.

For example, third generation GSM standards provide for a general packet radio service (GPRS) network that is integrated into or over-laid on a circuit-switched network. Other types of wireless packet data networks include cellular digital packet data (CDPD) and IS-95 Data. Using a mobile telephone that is capable of communicating in both a circuit-switched mode or a packet-switched mode, a cellular subscriber has access to both voice and data communication services. A telephone that supports wireless application protocol (WAP), for instance, allows for both types of communications and also provides a wireless telephony application (WTA) interface that permits interaction between packet-based and circuit-based services within the mobile telephone.

As usage of mobile telephones for voice communications continues to expand, cellular systems are frequently experiencing severe congestion during busy call hours. This problem is exaggerated by billing schemes that offer subscribers free (or reduced rate) night and weekend calling. As a result of these free calling schemes, talk times tend to increase dramatically, thereby prolonging periods of congestion.

When a cellular subscriber encounters congestion in the circuit-switched network, his or her call request or other service request is typically rejected because the system does not have sufficient capacity to handle the request. The subscriber can continue re-sending the request until a voice channel becomes available or can wait until a later time when the system is no longer congested. These options, however, can be time-consuming and frustrating. In some cases, the network might use a directed retry procedure in an attempt to obtain a voice channel in an adjacent cell. Such a procedure, however, is not always successful.

Finally, subscribers can obtain special priorities on a subscription basis. In other words, a subscriber might be able to pay extra monthly fees to obtain service access priorities as compared with subscribers that have a standard subscription agreement. Such special priorities might increase the subscriber's chances of accessing the network during busy periods, but they generally would not provide access to the network at times when there simply are no voice channels available. Moreover, such special priorities are static (i.e., they must be paid for and established on a subscription basis rather than on a per call basis). If an intended call was not of particular importance, the subscriber might want to manually try the call at a later time. A static priority system does not provide that option. On the other hand, a subscriber might also have an emergency in which case he wants to be able to obtain access to the system as soon as possible. Unless the subscriber previously negotiated a special priority, however, he will not be able to obtain any priority during the emergency situation.

There is a need, therefore, for a system and method for assigning priority in a cellular system on a per call or per service request basis. Preferably, such a system and method would allow a subscriber, when the network is congested, to request priority for a particular call request and to further perform such a priority request using a minimal amount of the already scarce network resources. In exchange, the subscriber could be charged a service fee, or the call, once connected, could be charged at a premium rate. This would allow a mobile telecommunications system operator to increase the number of available services and to generate additional revenue.

SUMMARY OF THE INVENTION

The present invention comprises a method and system for reserving radio channels in a mobile telecommunications network. A mobile station operating in the network requests that a radio channel be reserved for its use by transmitting an immediate call reservation (ICR) service request. In response, the network subsequently identifies an idle radio channel that can be accessed by the mobile station. The network then reserves the idle radio channel for use by the mobile station.

In accordance with one embodiment of the invention, one network is used for voice communications and another network is used for the ICR service request. An initial radio access attempt is performed on a first network, such as a circuit-switched network. Responsive to failure of that attempt, the ICR request is transmitted via a second network, such as a packet-switched network, thereby avoiding additional congestion in the first network. The second network then performs much of the necessary processing of the ICR service request and interacts with the first network to perform the requested radio channel reservation.

In accordance with another embodiment of the invention, a list of mobile stations that are awaiting access to radio channels is stored in the mobile telecommunications network. The list serves as a queue of mobile stations that have submitted an ICR service request. As radio channels become available, each radio channel is allocated for use by one of the mobile stations on the ICR list.

In accordance with yet another embodiment of the invention, the mobile telecommunications system includes a circuit-switched network, a packet-switched network, and a service platform. The service platform interfaces with both the circuit-switched network and the packet-switched network. The service platform receives ICR service requests via the packet-switched network and, in response, initiates a reservation of a radio channel in the circuit-switched network for use by the mobile station.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
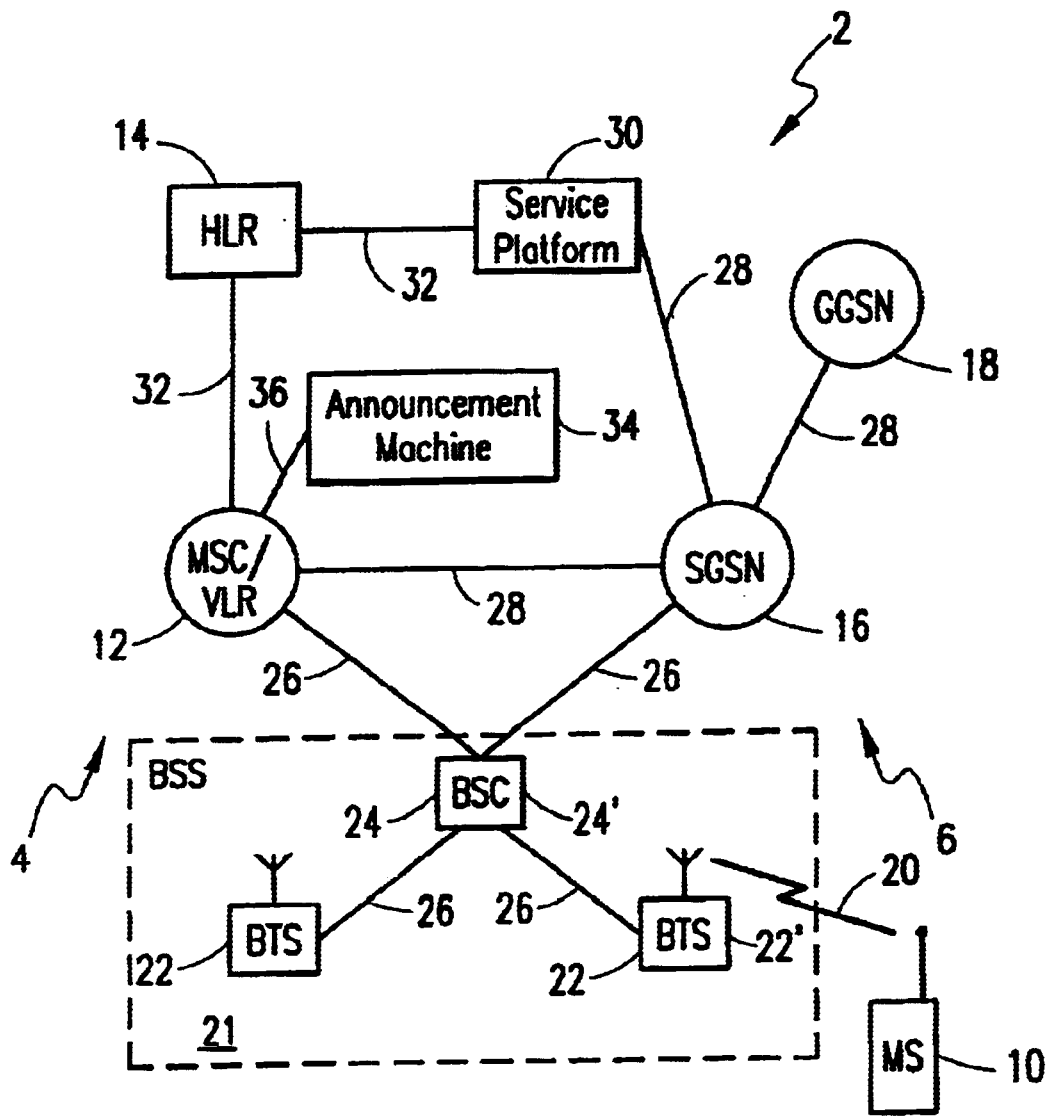
FIG. 1 is a block diagram of a wireless communication system in accordance with the present invention.

Reference is now made to the Drawings wherein like reference characters denote like or similar parts throughout the various Figures. Referring now to FIG. 1, there is shown a block diagram of a wireless communication system 2 in accordance with the present invention. Although the invention is depicted, and hereinafter described, in connection with a GSM architecture, it will be understood by those of ordinary skill in the art that the concepts are directly applicable to other types of systems. For example, although the system is shown as including a general packet radio service (GPRS) system, the invention is equally applicable in connection with a CDPD or IS-95 Data network.

The system 2 includes a circuit-switched network 4, which includes a mobile switching center/visitor location register (MSC/VLR) 12 and a home location register (HLR) 14, and a packet-switched network 6, which includes a serving GPRS support node (SGSN) 16 and a gateway GPRS support node (GGSN) 18. The GGSN 18 is used for providing access between the GPRS 6 and other external packet-switched networks, such as the Internet. A mobile station (MS) 10 associated with the HLR 14 and operating in the system 2 is assumed to have the capability to communicate and to execute applications in both circuit-switched and packet-switched networks 4 and 6. Preferably, the mobile station 10 supports wireless application protocol (WAP) or some similar capability that allows an inter-working of services between the networks 4 and 6.

When the mobile station (MS) 10 attempts to initiate a voice call, it sends a call set-up request to the circuit-switched network 4 via a control channel on an air interface 20. Generally, the call set-up request is received by a serving base station system 21, which includes a base transceiver station (BTS) 22 and a base station controller (BSC) 24, and routed over signaling connections 26 to a serving MSC 12. The serving MSC 12 then routes the call to other MSCs 12 (not shown) and/or to a public switched telephone network (PSTN) (not shown) in accordance with the call set-up request.

If, however, the circuit-switched network 4 is congested (e.g., no radio channels are available for voice communications in the cell that is served by the serving BSS 21 or in any overlaid or underlaid cells), the requested call connection cannot be completed. In the preferred embodiment, the BSS 21 or the MSC 12 will therefore deny the call set-up request by sending the mobile station 10 a fast busy signal, or some other appropriate signal, indicating that no voice channels are currently available. Alternatively, the requested call connection will simply fail, causing the mobile station 10 to display or otherwise generate an indication of the failure when it does not receive an acknowledgment of the call set-up request.

Once the subscriber is notified of the congested condition in the circuit-switched network 4, the subscriber can initiate an immediate call reservation (ICR) service by sending an ICR service request via a radio channel in the packet-switched network 6. The ICR service request comprises a request to reserve a radio channel in the circuit-switched network and can further designate a called party number identifying a party to which the subscriber wishes to be connected. In accordance with one embodiment of the invention, an application on the circuit-switched side of the mobile station 10, using the inter-working capability of the mobile station 10, can automatically initiate the ICR service on the packet-switched side without any action by the subscriber. In an alternative embodiment, the mobile station 10, as a result of a detection of network congestion, can prompt the subscriber with menu options that allow the subscriber to invoke the ICR service. The menu options can further permit the subscriber to enter a priority level for the ICR service request, or the priority level can be a default level associated with the subscription.

Communications on the packet-switched network 6 are conducted over the air interface 20 using different channels than are used for voice communications. Depending on the system 2 architecture, the packet-switched communication channels can be supported by radio equipment (i.e., a packet-switched BTS 22' and BSC 24') that is co-located with the BTS 22 and BSC 24 used for voice communications or can be supported by an entirely separate, but overlapping, packet-switched radio network.

Because wireless packet data networks 6 are relatively new and because only a limited amount of data services are currently being offered, such networks 6 tend to be under-utilized as compared with circuit-switched networks 4. Furthermore, packet-switched networks 6 operate according to a capacity on demand mechanism that require only a few seconds to transmit the data required to implement an ICR service. As a result of these factors, the subscriber's request to initiate the ICR service via the packet-switched network 6 has a much higher probability of success in a congested system 2 than does an initial request for a voice call connection. In other words, congestion in the system 2 is much more likely to prevent a successful voice channel assignment (in the circuit-switched network) than it is to prevent a successful transmission of an ICR service request (in the packet-switched network).

Upon receipt of the ICR service request, the request is forwarded to a service platform 30 via a packet data signaling connection 28. The service platform 30 is similar to a conventional service control point (SCP) except that it supports packet-switched services in addition to traditional circuit-switched telecommunication services. The service platform 30, therefore, has the capability to coordinate and prioritize the inter-working of services in both networks 4 and 6. In connection with the ICR service request, the service platform 30 contacts the HLR 14 via a Signaling System No. 7 (SS7) connection 32 to perform authentication, fraud analysis, and security checks for the requesting mobile station 10. In addition, the service platform 30 obtains location information, which identifies the serving MSC 12 for the area in which the mobile station 10 is currently located. The location information is updated in accordance with registration signals that are periodically sent from the mobile station 10 to the MSC/VLR 12 via a control channel in the serving cell. The MSC/VLR 12 then forwards the registration/location data to the HLR 14.

If, based on the communications between the service platform 30 and the HLR 14, the ICR service request is approved, an order is sent to the serving MSC 12 to add an identification of the mobile station 10 to an ICR list that is maintained at the MSC/VLR 12. Preferably, the MSC/VLR 12 maintains one ICR list per BSS 21. Accordingly, the mobile station 10 is added to the ICR list for the BSS 21 that serves the cell or area in which the mobile station 10 is currently located. The ICR list comprises a call set-up or radio channel reservation queue for mobile stations 10 that are located in that cell. The ICR list can be arranged according to the order in which ICR service requests have been received and approved, or can be arranged according to priority data contained in the ICR service requests or associated with the requesting mobile stations' subscriptions.

When a voice channel in the serving cell becomes idle, the BSS 21 for that cell sends a message to the MSC 12 notifying the MSC 12 of the idle channel. In response, the MSC 12 sets up a call (i.e., a voice path) between an announcement machine 34 and the mobile station 10 that is at the top of the ICR list associated with the BSS 21. The announcement machine plays a recorded message indicating that the voice channel has been reserved for the mobile station 10. The mobile station 10 can then initiate a call using the reserved voice channel. Alternatively, if the ICR service request includes a designation of the called party number, the announcement machine 34 can inform the mobile station 10 that a voice channel is now available and/or request confirmation that the subscriber still wishes to place the call. The MSC 12 can then automatically set up a call connection to the called party number. As an additional alternative, the MSC 12 can automatically set up the call connection without use of the announcement machine 34. In such a case, the mobile station 10 can be directed to provide a special ring signal to notify the subscriber that the previously requested call is being connected.

After the mobile station 10 is added to the ICR list, it is also possible to remove the mobile station 10 from the list. For example, the subscriber might cancel the ICR service request by sending an ICR service cancellation message via the packet-switched network 6. As a result, the SGSN 16 or the service platform 30 can send instructions to the MSC/VLR 12 to remove the mobile station 10 from the ICR list.

In accordance with another aspect of the invention, ICR lists can be updated as the mobile station 10 moves between cells. If the mobile station 10 travels out of the territory served by the original MSC/VLR 12, the mobile station 10 registers with a new MSC/VLR 12 that serves the territory into which the mobile station 10 has traveled. The new MSC/VLR 12 sends a registration message to the HLR 14. As a result, the HLR 14 recognizes that the mobile station 10 is no longer located in the territory served by the original MSC/VLR 12. The HLR 14 sends a registration cancellation message to the original MSC/VLR 12 providing notification of the location change. Then, the MSC/VLR 12 removes the mobile station 10 from the ICR list and notifies the SGSN 16 that the mobile station 10 has changed location. The SGSN 16 obtains the new location information (i.e., the new MSC/VLR 12) from the HLR 14 and sends a request to the new MSC/VLR 12 to add the mobile station 10 to the ICR list for the appropriate BSS 21 (i.e., the BSS 21 for the cell in which the mobile station 10 is located). If an ICR list does not exist in the new MSC/VLR 12 for that BSS 21 and at least one idle channel exists, the new MSC 12 immediately sets up the call between the announcement machine 34 and the mobile station 10.

Also, if the mobile station 10 moves from one cell to another cell served by the same MSC/VLR 12, the MSC/VLR 12 receives an indication, via a BSS 21 that serves the new cell, that the mobile station 10 has moved into the new cell. As a result, the MSC/VLR 12 removes the mobile station 10 from the ICR list for the first cell and adds the mobile station 10 to the ICR list for the BSS 21 serving the target cell. If a voice channel is available in that cell, the call will be set up immediately in the new cell.

Figure 2:
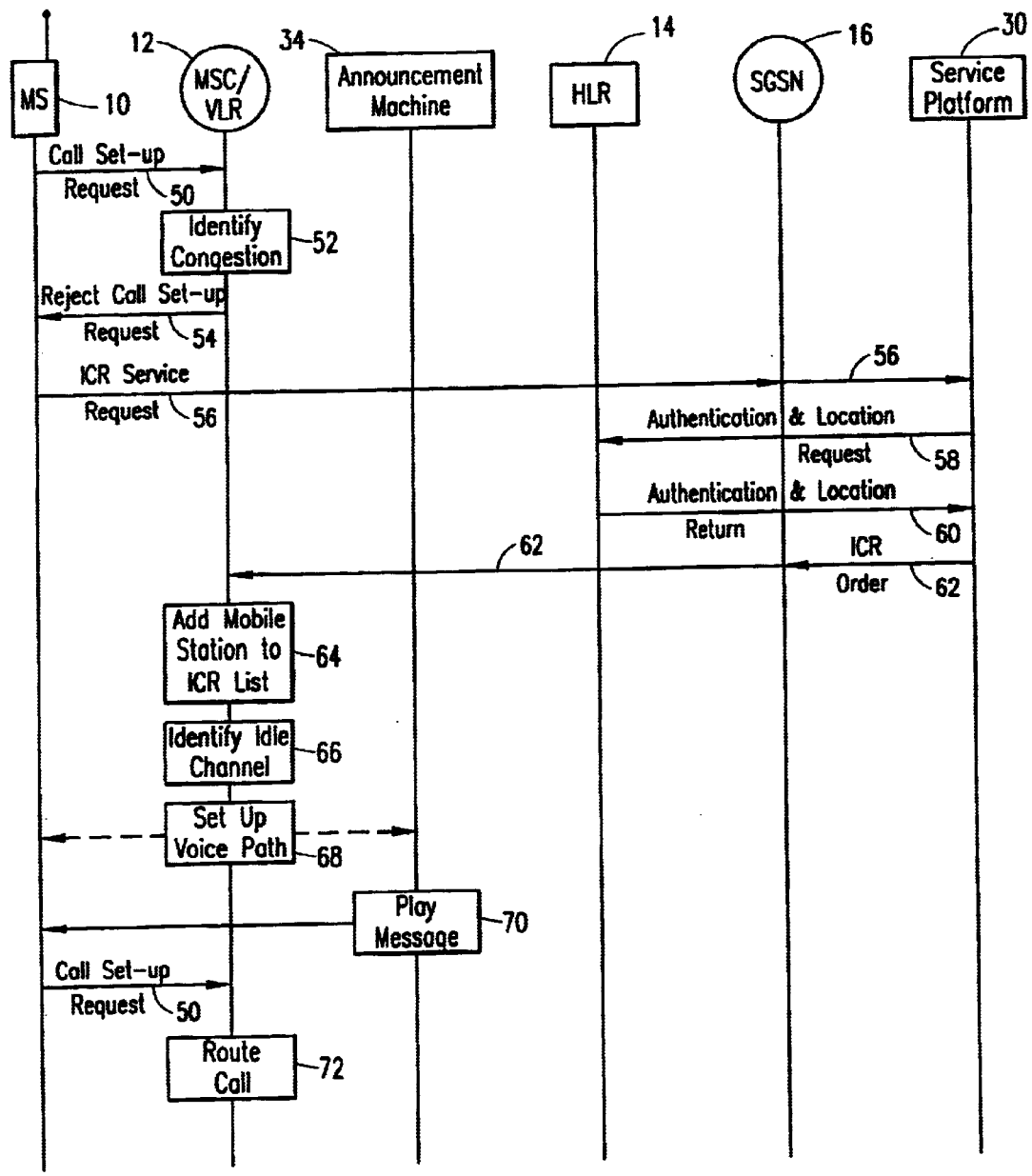
FIG. 2 illustrates a timing and message flow diagram for implementing the immediate call reservation service of the present invention.

In FIG. 2, there is illustrated a timing and message flow diagram for implementing the immediate call reservation service of the present invention. Referring now to FIGS. 1 and 2, a WAP-capable mobile station 10 transmits a call set-up request 50 to an MSC/VLR 12 that serves the area in which the mobile station 10 is located. Because of a high volume of ongoing calls in the network 4, however, no voice channels are available for use by the mobile station 10. The MSC/VLR 12 identifies this congested condition at step 52 and, as a result, sends a message 54 rejecting the call setup request.

After receiving notification of the rejected set-up request, the subscriber chooses to initiate the ICR service by transmitting an ICR service request 56 via a packet data signaling connection 28 to the SGSN 16 that serves the area in which the mobile station 10 is located. The SGSN 16 forwards the ICR service request 56 to the service platform 30 via another packet data signaling connection 28. The service platform 30 includes software for implementing the ICR service by first sending separate authentication and location request messages (as collectively indicated at 58) to the HLR 14 associated with the mobile station 10 via an SS7 connection 32. The HLR 14 retrieves subscription data for the mobile station 10 as well as data identifying the current location, within the circuit-switched network 4, of the mobile station 10 and returns this data to the service platform 30 in separate return messages (as collectively indicated at 60).

Using this data, the service platform 30 confirms that the mobile station 10 is entitled to use the ICR service and sends an ICR order message 62 directing the MSC/VLR 12 to add the mobile station 10 to its ICR list. The ICR order message 62 includes an identifier of the mobile station 10 and can also include a priority level indication for the ICR service request and a called party number identifying the party that the subscriber wishes to call. The ICR order message 62 can be sent to the MSC/VLR 12 through the SGSN 16 via packet data signaling connections 28, or through the HLR 14 via SS7 connections 32.

In response to the ICR order message 62, the MSC/VLR 12 adds the mobile station 10 to an ICR list that corresponds to the area in which the mobile station 10 is currently located at step 64. Eventually, as ongoing calls in the area terminate or are handed off to other cells, the mobile station 10 reaches the top of the ICR list (i.e., it is first in the queue). Subsequently, the MSC/VLR 12 identifies an idle channel that can be accessed by the mobile station 10 at step 66. The MSC/VLR 12 reserves the channel for the mobile station 10 and sets up a voice path, via a signaling trunk 36 and signaling connections 26, between an announcement machine 34 and the mobile station 10 at step 68. The announcement machine 34 plays a message at step 70 to notify the subscriber that a voice channel is now available and reserved for use by the mobile station 10. The subscriber can then initiate a new call set-up request 50, or alternatively can confirm that he still wishes to place the call. As a result, the MSC/VLR 12 routes the call in accordance with the called party number at step 72.

Figure 3:
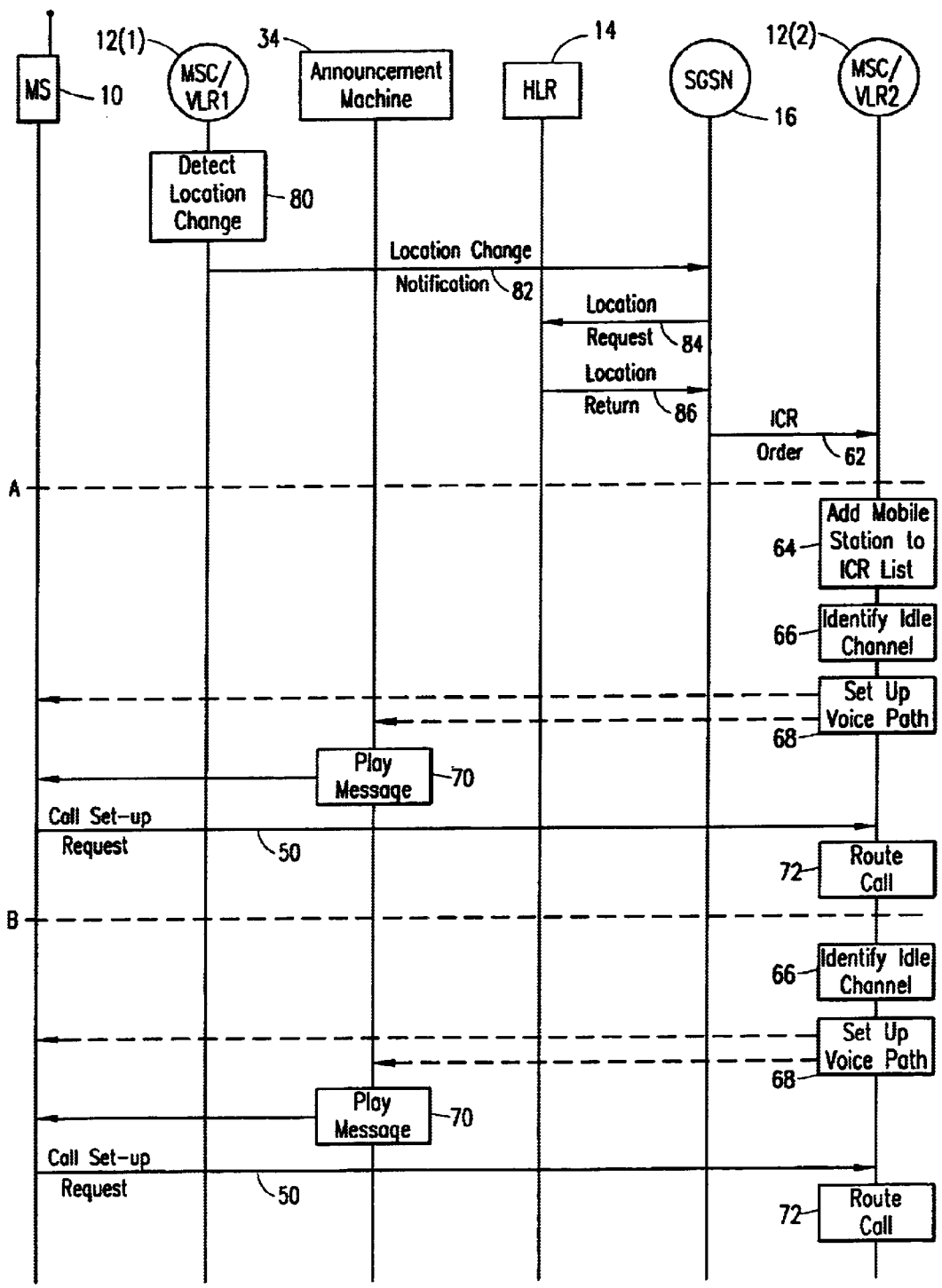
FIG. 3 is an illustration of a timing and message flow diagram for handling the immediate call reservation service when a mobile station changes location in accordance with another embodiment of the present invention.

Referring now to FIG. 3, there is illustrated a timing and message flow diagram for handling the immediate call reservation service when a mobile station 10 changes location in accordance with another embodiment of the present invention. In this Figure, it is assumed that the ICR service has previously been initiated (i.e., in accordance with steps and messages 50–64). Thus, the mobile station 10 is identified on an ICR list at a first MSC/VLR 12(1) that serves the area where the mobile station 10 is initially located. At step 80, however, a first MSC/VLR 12(1) containing the ICR list is notified that the mobile station 10 has moved out of its service area (according to the registration cancellation procedure discussed above). As a result, the first MSC/VLR 12(1) removes the mobile station 10 from the ICR list and sends a location change notification message 82 to the SGSN 16. The SGSN 16 attempts to locate the mobile station 10 by sending a location request 84 to the HLR 14. In response, the HLR 14 sends a location return message 86 to the SGSN 16. The location return message 86 identifies a new MSC/VLR 12(2), which serves the area into which the mobile station 10 has traveled. The SGSN 16 then sends an ICR order message 62 to the new MSC/VLR 12(2).

If no voice channels capable of serving the mobile station 10 are available in the new MSC/VLR 12(2), the ICR process must again be implemented in the new MSC/VLR 12(2) (as illustrated between dotted lines A and B of FIG. 3). The MSC/VLR 12(2) adds the mobile station 10 to an ICR list that corresponds to the area in which the mobile station 10 is currently located at step 64. Eventually, the MSC/VLR 12(2) identifies an idle channel that can be accessed by the mobile station 10 at step 66. The MSC/VLR 12(2) reserves the channel for the mobile station 10 and sets up a voice path, via a signaling trunk 36 and signaling connections 26, between an announcement machine 34 and the mobile station 10 at step 68. The announcement machine 34 plays a message at step 70 to notify the subscriber that a voice channel is now available and reserved for use by the mobile station 10. The subscriber can then initiate a new call set-up request 50, or alternatively can confirm that he still wishes to place the call. As a result, the MSC/VLR 12(2) routes the call in accordance with the called party number at step 72.

On the other hand, if at least one voice channel capable of serving the mobile station 10 is available in the new MSC/VLR 12(2) when it receives the ICR order message 62, the new MSC/VLR 12(2) does not need to add the mobile station 10 to an ICR list. Instead, the MSC/VLR 12(2), as illustrated below dotted line B in FIG. 3, simply identifies an idle channel that can be accessed by the mobile station 10 at step 66. The MSC/VLR 12(2) reserves the channel for the mobile station 10 and sets up a voice path, via a signaling trunk 36 and signaling connections 26, between an announcement machine 34 and the mobile station 10 at step 68. The announcement machine 34 plays a message at step 70 to notify the subscriber that a voice channel is now available and reserved for use by the mobile station 10. The subscriber can then initiate a new call set-up request 50, or alternatively can confirm that he still wishes to place the call. As a result, the MSC/VLR 12(2) routes the call in accordance with the called party number at step 72.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for reserving a communication channel in a mobile telecommunications system, comprising the steps of:
    attempting a mobile station access of a radio channel in the first network;
    denying the mobile station access attempt;
    upon denial of the mobile station access attempt, sending a request from the mobile station, via a radio channel in a second network of the mobile telecommunications system, to reserve a radio channel in a first network of the mobile telecommunications system, said radio channel for use by the mobile station; and
    reserving a radio channel in the first network in response to said request, the second network interacting with the first network to reserve said radio channel.

2. The method of claim 1, wherein said first network comprises a circuit-switched network.

3. The method of claim 2, wherein said second network comprises a packet-switched network.

4. The method of claim 1, wherein said attempted mobile station access comprises a request to set up a call connection with a selected called party.

5. The method of claim 1, wherein said step of denying the mobile station access attempt results from an unavailability of radio channels in the first network.

6. The method of claim 1, wherein said request includes an indication of a priority level, on a per call basis, for the radio channel reservation.

7. The method of claim 1, wherein said step of reserving the radio channel in the first network comprises the step of storing an identification of the mobile station in a call reservation list.

8. The method of claim 7, wherein the step of reserving the radio channel in the first network further comprises the steps of:
    identifying an idle radio channel in the first network; and
    allocating said idle radio channel for use by the mobile station.

9. The method of claim 8, further comprising the step of notifying the mobile station of the allocated radio channel.

10. The method of claim 9, further comprising the step of connecting a call involving the mobile station via the allocated radio channel.

11. The method of claim 7, wherein the call reservation list is associated with a first cell in the mobile telecommunication system.

12. The method of claim 11, further comprising the steps of:
    detecting that the mobile station has moved into a second cell of the mobile telecommunications system;
    removing the stored identification of the mobile station from the call reservation list associated with the first cell; and
    storing the identification of the mobile station in a call reservation list associated with the second call.

13. The method of claim 12, wherein the step of reserving the radio channel in the first network further comprises the steps of:
    identifying an idle radio channel of the first network, said idle radio channel in the second cell; and
    allocating said idle radio channel for use by the mobile station.

14. A method for queuing access to traffic channels in a mobile telecommunications network, comprising the steps of:
    attempting to initiate a call from a mobile station, wherein the call attempt fails due to call traffic congestion in a circuit-switched network of the mobile telecommunications network;
    detecting a movement of the mobile station into a second cell of the mobile communications;

requesting, via a packet-switched network, a reservation of a traffic channel for use by the mobile station in response to the failure of the call attempt; and storing, in the circuit-switched network, an identification of the mobile station in a list associated with the second cell of mobile stations that have requested a traffic channel reservation, said list comprising a queue of mobile stations waiting to access a traffic channel.

15. The method of claim 14, wherein the call traffic congestion comprises an absence of available traffic channels capable of being accessed by the mobile station.

16. The method of claim 14, wherein said traffic channel reservation request is transmitted via a packet-switched network.

17. The method of claim 14, wherein said list of mobile stations is stored in a switching node of the mobile telecommunications network.

18. The method of claim 14, further comprising the steps of:

identifying an idle traffic channel; and allocating the idle traffic channel for use by the mobile station.

19. The method of claim 18, wherein the step of allocating the idle traffic channel is performed after the mobile station becomes first in the queue of mobile stations.

20. The method of claim 19, further comprising the step of completing a call connection using said allocated traffic channel.

21. The method of claim 14, further comprising the step of identifying a priority level for the reservation of a traffic channel.

22. A method for queuing access to traffic channels in a mobile telecommunications network, comprising the steps of:

attempting to initiate a call from a mobile station, wherein the call attempt fails due to call traffic congestion in a circuit-switched network of the mobile telecommunications network;

requesting, via a packet-switched network, a reservation of a traffic channel for use by the mobile station in response to the failure of the call attempt;

storing, in the circuit-switched network, an identification of the mobile station in a list associated with a first cell of the mobile telecommunications network of mobile stations that have requested a traffic channel reservation, said list comprising a queue of mobile stations waiting to access a traffic channel;

detecting a movement of the mobile station into a second cell of the mobile telecommunications network;

identifying an idle traffic channel in the second cell; and allocating the identified idle traffic channel for use by the mobile station.

23. A mobile telecommunications system, comprising:

a circuit-switched network;

a packet-switched network; and a service platform operating to receive, via the packet-switched network, a request to reserve a radio channel in the circuit-switched network for use by a particular mobile station, said service platform operating to initiate a reservation of a radio channel in the circuit-switched network for call use by the particular mobile station in response to said request, wherein the service platform initiates the reservation of the radio channel by sending a call reservation message to a serving switching node;

wherein the request is received by the service platform responsive to a failed attempt by the particular mobile station to access a radio channel of the circuit-switched network.

24. The system of claim 23, wherein the packet-switched network comprises a general packet radio service network.

25. The system of claim 23, wherein the packet-switched network comprises a CDPD network.

26. The system of claim 23, wherein the circuit-switched network includes a serving switching node.

27. The system of claim 23, wherein the serving switching node stores an identification of the mobile station in a call reservation list in response to the call reservation message.

28. The system of claim 27, wherein said serving switching node operates to identify an idle radio channel in the circuit-switched network and to allocate the identified radio channel to the mobile station identified on the call reservation list.

29. The system of claim 28, wherein the switching node operates to initiate a call connection involving the mobile station via the allocated radio channel.

30. The system of claim 28, further comprising an announcement machine for notifying the mobile station of the allocated radio channel, wherein the switching node operates to connect the announcement machine to the mobile station via the allocated radio channel.

31. The system of claim 27, wherein the call reservation list is associated with a first cell in which the mobile station is initially located, the serving switching node operating to remove the stored identification of the mobile station from the call reservation list associated with the first cell in response to a received indication that the mobile station is currently located in a second cell.

* * * * *